(12) United States Patent
Norrick

(10) Patent No.: US 6,892,715 B2
(45) Date of Patent: May 17, 2005

(54) CRANKCASE VENTILATION SYSTEM

(75) Inventor: Daniel A. Norrick, New Brighton, MN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/613,685

(22) Filed: Jul. 3, 2003

(65) Prior Publication Data

US 2005/0000496 A1 Jan. 6, 2005

(51) Int. Cl.$^7$ .............................................. F02B 33/44
(52) U.S. Cl. ..................................... 123/572; 123/563
(58) Field of Search ................................ 123/572–574, 123/559.1–563

(56) References Cited

U.S. PATENT DOCUMENTS

| | | | | |
|---|---|---|---|---|
| 4,557,226 A | * | 12/1985 | Mayer et al. | 123/41.86 |
| 5,456,239 A | * | 10/1995 | Henderson et al. | 123/563 |
| 5,499,616 A | * | 3/1996 | Enright | 123/572 |
| 6,112,707 A | * | 9/2000 | Kirk | 123/65 BA |
| 6,722,129 B2 | * | 4/2004 | Criddle et al. | 60/605.2 |

* cited by examiner

Primary Examiner—Marguerite McMahon
(74) Attorney, Agent, or Firm—Woodard, Emhardt, Moriarty, McNett & Henry LLP

(57) ABSTRACT

An improved crankcase ventilation system for a vehicle which includes an air compressor to route crankcase gases to the intake manifold for combustion. The primary vehicle components include and aircleaner, a turbocharger compressor positioned downstream from the aircleaner, an optional aftercooler positioned downstream from the turbocharger compressor, and an engine having an intake manifold and a crankcase equipped with a breather port for venting crankcase gases. Crankcase gases are vented through the breather port to the air compressor. Clean air from downstream of the aircleaner but upstream of the turbocharger compressor is drawn into the air compressor as needed to prevent the air compressor from drawing too much crankcase gas and reducing the internal pressure of the crankcase to undesirable levels. The pressurized crankcase gases are introduced into the intake air stream downstream of the aftercooler and upstream of the intake manifold so as to prevent fouling of the turbocharger compressor and aftercooler by contaminants in the crankcase gases. The crankcase gases are then combusted in the engine and not vented directly to the environment.

24 Claims, 2 Drawing Sheets

CRANKCASE VENTILATION SYSTEM

FIELD OF THE INVENTION

The present invention relates generally to the regulation of crankcase pressures in internal combustion engines and, in particular, to a crankcase ventilation system which returns crankcase gasses to the engine for combustion.

BACKGROUND OF THE INVENTION

In most internal combustion engines, it is desirable to maintain the pressure within the crankcase at a level equal to or slightly less than atmospheric pressure to reduce leaks through gaskets and seals from the crankcase to the atmosphere. As is well known, in an internal combustion engine, so-called blow-by gases are emitted in the crankcase as a result of leaks of the air-fuel intake mixture and combustion gases through the clearances around piston rings during the compression, combustion and/or exhaust cycles. Because of these blow-by gases, the internal crankcase pressure will inherently rise promoting oil leakage from the crankcase to the surrounding environment.

Traditionally, excess crankcase pressure was vented to the atmosphere through a breather port to solve this problem. More recently, environmental considerations have dictated that the blow-by gases in the crankcase not be released to the atmosphere untreated. One method of dealing with blow-by gases in an environmentally acceptable manner vents these gases back to the combustion chamber. Such closed crankcase ventilation (CCV) systems recycle the blow-by gases by burning these gases together with the air-fuel intake mixture, thereby preventing the direct release of oil, uncombusted fuel and other pollutants to the environment.

Many heavy duty and high horsepower engines use a turbocharger or supercharger to increase the power output of the engine. In such an engine, the fresh air intake is pressurized before entering the combustion chamber, thereby allowing the combustion of more fuel and producing more power for a given engine volume. This design creates difficulties for CCV systems as the lower pressure blow-by gases cannot be introduced directly into the higher pressure intake air line. One possible solution to this problem is to introduce the blow-by gases upstream of the turbocharger prior to pressurization of the intake air. This method is unsatisfactory, however, as particulate contaminants in the blow-by gases such as oil droplets and partially combusted hydrocarbons can lead to pitting and fouling of the turbocharger.

SUMMARY OF INVENTION

The invention is set forth in the claims below, and the following is not in any way to limit, define or otherwise establish the scope of legal protection. In general terms, the present invention relates to a crankcase ventilation system for a vehicle which pressurizes crankcase blow-by gases and routes them to the engine intake manifold for combustion. The crankcase ventilation system according to one embodiment of the present invention is integrated into a vehicle engine system which includes an aircleaner, a turbocharger compressor, an aftercooler, and an engine having an intake manifold and a crankcase equipped with a breather port for venting crankcase gases. Crankcase gases are vented through the breather port to an auxiliary air compressor. Clean air from downstream of the aircleaner but upstream of the turbocharger compressor is drawn into the air compressor to prevent the compressor from drawing too much crankcase gas and reducing the internal pressure of the crankcase to undesirable levels. The crankcase gases are pressurized and introduced into the intake air stream downstream of the aftercooler and upstream of the intake manifold for combustion.

One object of the present invention is to provide an improved crankcase ventilation system including an air compressor for receiving and compressing crankcase blow-by gases.

Another object of the present invention is to provide an improved crankcase ventilation system for a turbocharged engine where crankcase blow-by gases are returned to the engine intake manifold without first passing through the turbocharger.

Further objects, embodiments, forms, benefits, aspects, features and advantages of the present invention may be obtained from the description, drawings, and claims provided herein.

DESCRIPTION OF THE PREFERRED EMBODIMENTS

Figure 1:
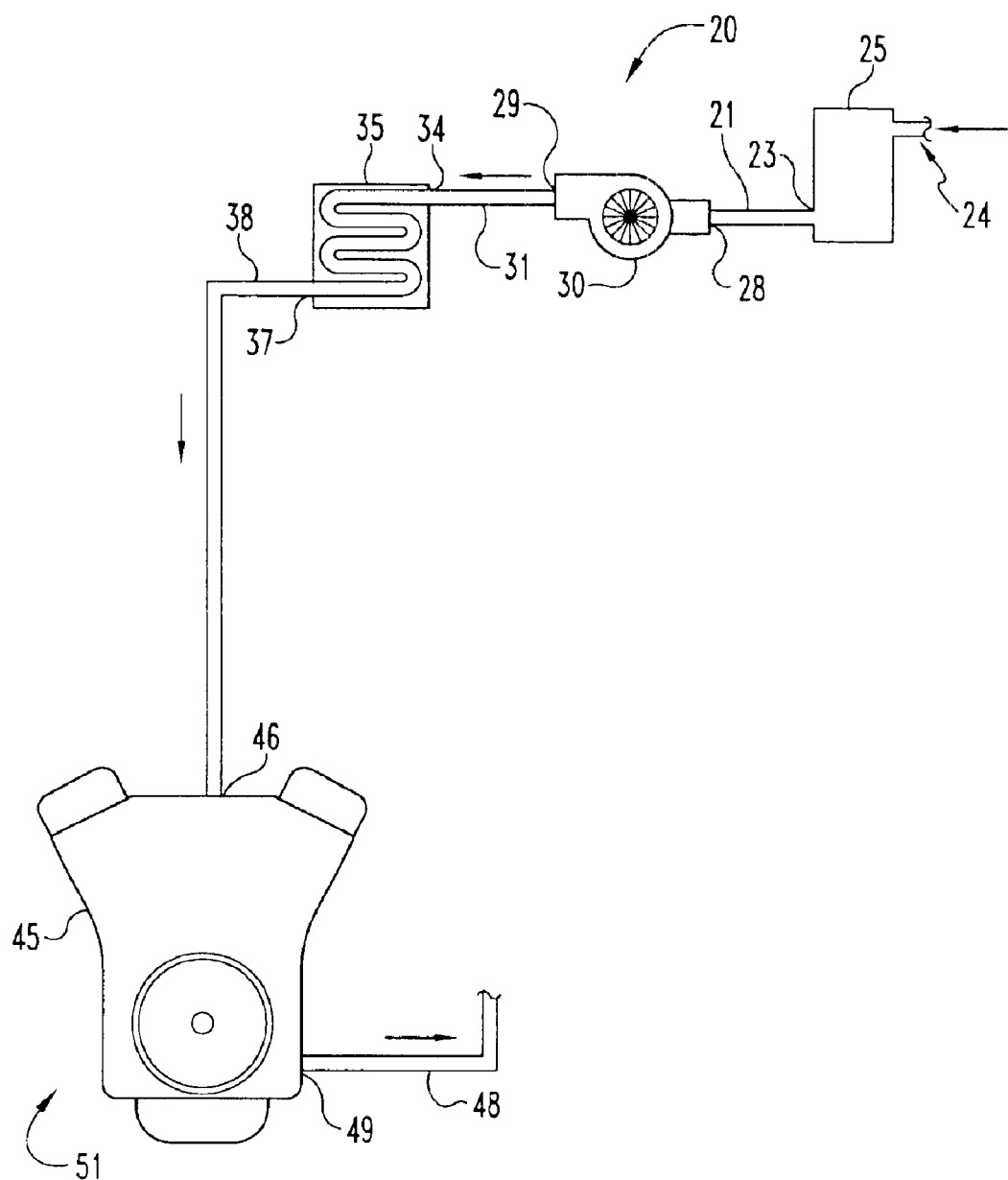
FIG. 1 is a diagrammatic representation of a turbocharged engine.

For the purposes of promoting understanding of the principles of the invention, reference will now be made to the embodiments illustrated in the drawings and specific language will be used to describe the same. It will nevertheless be understood that no limitation of the scope of the invention is hereby intended and alterations and modifications in the illustrated device, and further applications of the principles of the present invention as illustrated herein being contemplated as would normally occur to one skilled in the art to which the invention relates.

FIG. 1 is a diagrammatic representation of a turbocharged internal combustion engine ventilation system 20. System 20 includes an aircleaner 25, a turbocharger 30, an optional aftercooler 35 and a diesel engine 51. Aircleaner 25 includes an inlet 24 and an outlet 23. Turbocharger 30 includes an inlet 28 and an outlet 29. Aircleaner outlet 23 is connected to turbocharger inlet 28 by a conduit 21 and are effectively a common connection point in the sense of equivalent pressures. Any pressure differences between the outlet point and inlet point of a common connection point are due to slight line losses as fluids flow through the line. Aftercooler 35 includes an inlet 34 and an outlet 37. Turbocharger outlet 29 and aftercooler inlet 34 are connected by a conduit 31 and are a common connection point. Engine 51 includes a crankcase 45, an intake manifold 46 and a breather port 49. Intake manifold 46 is connected to aftercooler outlet 37 by a conduit 38. Intake manifold 46 and aftercooler outlet 37 are effectively a common connection point. Crankcase 45 is vented to the atmosphere through breather port 49 and into a breather line 48.

Fresh intake air enters system 20 through aircleaner inlet 24. Cleaned air exits the aircleaner 25 through outlet 23 and enters turbocharger compressor 30 through turbocharger inlet 28. The compressed air exits outlet 29 of turbocharger 30 which is connected to aftercooler inlet 34. The compressed and cooled air exits aftercooler outlet 37 and travels through aftercooler outlet conduit 38 to intake manifold 46. Blow-by gases which seep past piston rings and into crankcase 45 are bled out of crankcase 45 through breather port 49 and into breather line 48 and vented to the atmosphere.

Figure 2:
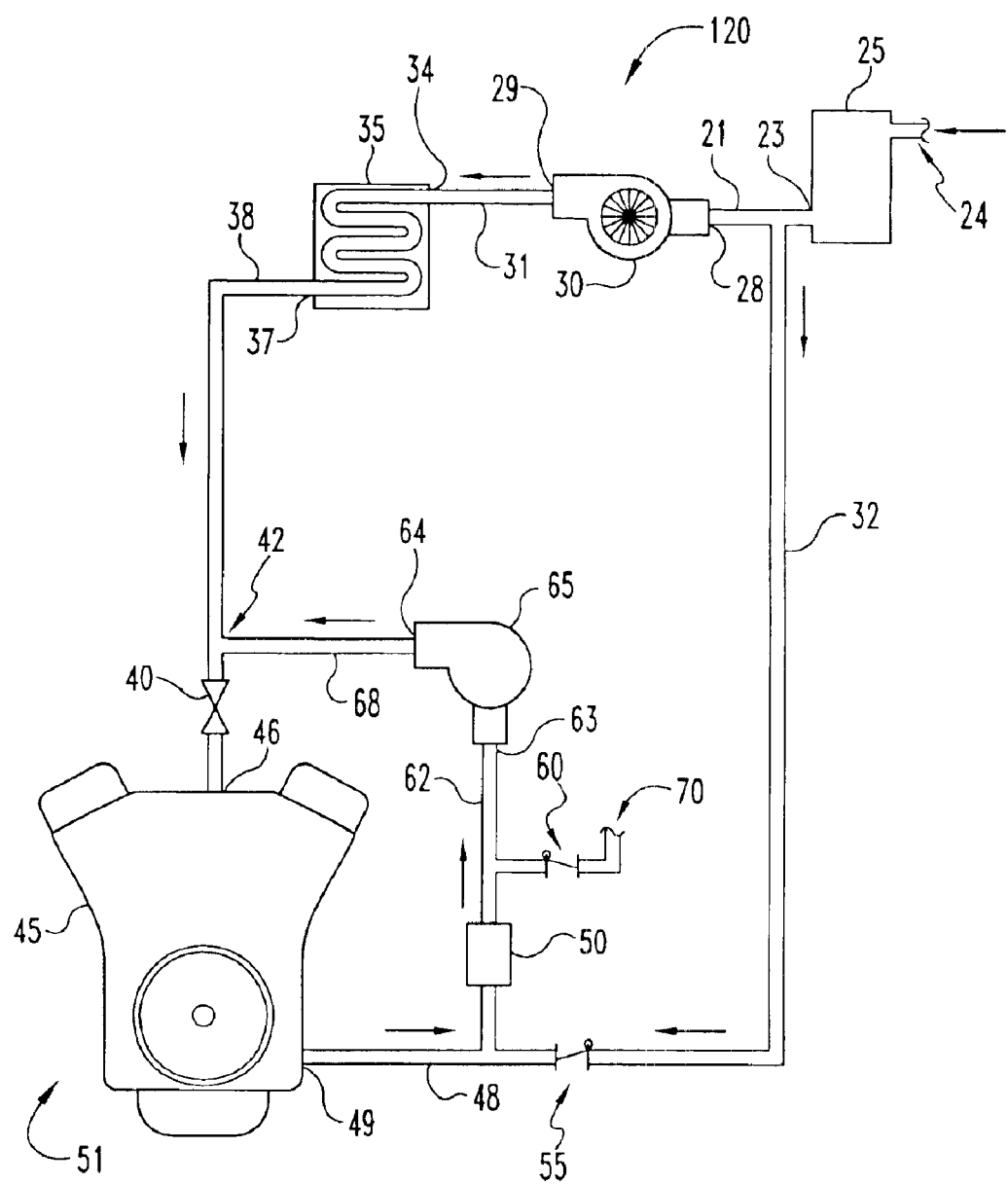
FIG. 2 is a diagrammatic representation of a crankcase ventilation system according to one embodiment of the present invention.

Referring to FIG. 2 there is illustrated a diagrammatic representation of a crankcase ventilation system 120 according to one embodiment of the present invention. Ventilation system 120 includes an air compressor 65 having an inlet 63 and an outlet 64 which are connected by two air flow conduits 62 and 68, respectively, to the existing components of a conventional internal combustion engine system such as a turbocharged diesel engine system previously described. The air compressor inlet conduit 62 is connected to breather port outlet 49 of engine 51 via breather line 48 and the compressor outlet conduit 68 is connected to aftercooler outlet conduit 38 downstream of aftercooler 35. Preferably, inlet conduit 62 includes a relief valve 60 and a vent 70 open to the atmosphere. Optionally, inlet conduit 62 further includes an oil separator 50 located between breather line 48 and air compressor inlet 63. Preferably, ventilation system 120 also includes a bleed air line 32 connected to conduit 21 downstream of aircleaner outlet 23 and to breather line 48 and a bypass damper valve 55 located between bleed air line 32 and breather line 48.

Fresh intake air enters system 120 through the aircleaner inlet 24. Cleaned air exits aircleaner 25 and enters turbocharger compressor 30 through turbocharger inlet 28. A conventional turbocharger powered by the exhaust gases of the engine is shown in FIG. 2 for illustrative purposes only. The crankcase ventilation system of the present invention may also employ a supercharger unit powered by the engine through a drive belt as is known in the art. In this particular example, the compressed air exits turbocharger outlet 29 which is also the inlet of aftercooler 35. The crankcase ventilation system of the present invention may also be used in internal combustion engine systems which lack an aftercooler unit. The compressed and cooled air exits aftercooler outlet 37 and enters aftercooler outlet conduit 38. Aftercooler outlet conduit 38 and intake manifold 46 are effectively a common connection point in the sense of equivalent pressures.

Blow-by gases that seep past piston rings and into crankcase 45 are bled out of crankcase 45 through breather port 49 and into breather line 48. Preferably, breather port 49 is configured such that the internal pressure of crankcase 45 is maintained as equal to or slightly less than atmospheric pressure. Optionally, breather port 49 may be configured and equipped with a sensor (not shown) which allows a computer (not shown) to monitor the amount of blow-by gases passing through breather port 49 so as to monitor engine wear as a function of the volume of blow-by gases passing through breather port 49. When the amount of blow-by gases passing through the breather port exceeds a predetermined maximum designated blow-by rate for a particular engine, typically a warning light or other indicator is activated to alert the driver than the engine requires maintenance.

Air compressor 65 is sized so as to compress the maximum designated flow rate of blow-by gases for a given engine to the pressure at intake manifold 46. Air compressor outlet conduit 68 and aftercooler outlet conduit 38 are effectively a common connection point in that they have equivalent pressure levels. Preferably, air compressor outlet connection point 42 is downstream of aftercooler 35 so as to isolate aftercooler 35 and turbocharger compressor 30 from blow-by gases. This configuration eliminates fouling and wear of both components from the contaminants such as oil vapor and partially combusted hydrocarbons present in blow-by gases.

Preferably air compressor 65 is a positive displacement type compressor such as a piston-type or screw-type compressor driven directly by the engine crankshaft through a vehicle's existing gear train. By powering the air compressor directly from the engine, the air compressor provides output at a fixed proportion of the current engine speed at any given time. Less preferably, the air compressor may be powered by an alternate means such as an electric motor where the compressor output is controlled by a computer or other suitable control means. The output of a positive displacement type compressor is relatively insensitive to the pressure at the intake manifold generated by the turbocharger compressor. Optionally, the air compressor is an existing air compressor as found on most commercial trucks and heavy work vehicles.

In one embodiment of the present invention, when ventilation system 120 is operating at maximum blow-by flow levels, bypass damper valve 55 remains closed. When system 120 is operating at less than maximum blow-by flow levels, such as when the engine is new so that little combustion gas seeps past the piston rings and into the crankcase, bypass damper valve 55 opens to allow makeup air from bleed air line 32 to be drawn into breather line 48. Bypass damper valve 55 is preferably sized and configured so as to maintain a constant air pressure at air compressor intake 63 to prevent air compressor 65 from drawing too much air through breather port 49 at times of low blow-by gas flow. This configuration prevents the development of undesirably low crankcase pressures. Preferably, bleed air line 32 draws filtered air from downstream of aircleaner 25, although bleed air line 32 may also draw air through a separate air filter (not shown). In an alternate embodiment, a computer controls the output of the air compressor so as to prevent the development of undesirably low crankcase pressures, thereby eliminating the need for a bleed air line and a bypass damper valve.

Relief valve 60 is preferably located on breather line 48 at a point between breather port 49 and air compressor intake 63. Relief valve 60 is sized and configured such that should the engine blow-by flow exceed the predetermined maximum flow for a particular engine, relief valve 60 opens and vents the excess blow-by gases to the surrounding environment through vent 70 to prevent possible damage to compressor and engine components. Such a condition of excessive blow-by flow might develop when piston rings are excessively worn or in the event of a catastrophic engine failure. Preferably, relief valve 60 includes a sensor (not shown) capable of detecting when the valve is opened and which is connected to the vehicle's control computer (not shown) so as to indicate to the driver that the engine requires maintenance. Optionally, vent 70 vents excess blow-by gases through a pollution control apparatus such as a filter (not shown) to prevent blow-by gases from entering the atmosphere untreated.

Optionally, oil separator 50 is located on breather line 48 at a point between breather port 49 and air compressor 65. An oil separator of a type as know in the art reduces the levels of entrained oil vapor in the blow-by gases thereby reducing fouling and wear on air compressor 65 and other components of system 120. Oil separator 50 is optionally located along breather line 48 such that makeup air from bleed air line 32 also passes through oil separator 50, as shown in FIG. 2, or such that makeup air from bleed air line 32 is introduced into breather line 48 downstream from oil separator 50. Preferably an air shut off valve 40 is located in aftercooler outlet conduit 38 at a point between intake manifold 46 and connection point 42 of air compressor outlet conduit 68 to aftercooler outlet conduit 38. Air shut off valve 40 acts as a safety back up allowing the driver to shut off the flow of air to engine 51, thereby shutting off the engine, in the event of engine overspeed caused by excessive oil vapor in the blow-by gases reintroduced into the intake air stream by the compressor.

The crankcase ventilation system of the present invention as previously described provides an effective means for recycling blow-by gases for combustion in a vehicle having a turbocharged or supercharged engine. Pressurization of blow-by gases using an air compressor allows introduction of the pressurized blow-by gases to the engine intake air stream downstream of existing vehicle components. This configuration prevents fouling of components such as such as the aircleaner and turbocharger compressor by contaminants in the blow-by gases. To prevent the air compressor from drawing too much crankcase gas and reducing the internal pressure of the crankcase to undesirable levels, the compressor optionally draws clean air from downstream of the aircleaner through a bleed air line. Crankcase pressure is therefore maintained at a desired level without emitting untreated combustion gases to the environment.

While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the inventions disclosed are desired to be protected. The articles "a", "an", "said" and "the" are not limited to a singular element, and include one or more such elements.

What is claimed is:

1. A crankcase ventilation system for a vehicle which routes vented crankcase gases to an intake manifold for combustion, said vehicle including an air cleaner, a first compressor located downstream from said aircleaner and having an inlet to receive air from said aircleaner, an aftercooler located downstream from said first compressor, and an engine located downstream from said aftercooler, said engine having an intake manifold, a crankshaft, a crankcase and a crankcase breather port through which blow-by gases exit said crankcase, said crankcase ventilation system comprising:

a second air compressor having an inlet and an outlet capable of delivering pressurized air to said intake manifold;

a breather line having an inlet to receive crankcase blow-by gases exiting said breather port and having an outlet that delivers said blow-by gases to said inlet of said second air compressor; and an oil separator located along said breather line prior to said second air compressor inlet.

2. The crankcase ventilation system of claim 1 wherein said second air compressor is a positive-displacement type compressor.

3. A crankcase ventilation system for a vehicle which routes vented crankcase gases to an intake manifold for combustion, said vehicle including an air cleaner, a first compressor located downstream from said aircleaner and having an inlet to receive air from said aircleaner, an aftercooler located downstream from said first compressor, and an engine located downstream from said aftercooler, said engine having an intake manifold, a crankshaft, a crankcase and a crankcase breather port through which blow-by gases exit said crankcase, said crankcase ventilation system comprising:

a second air compressor having an inlet and an outlet capable of delivering pressurized air to said intake manifold, wherein said second air compressor is powered by said crankshaft and a breather line having an inlet to receive crankcase blow-by gases exiting said breather port and having an outlet that delivers said blow-by gases to said inlet of said second air compressor.

4. The crankcase ventilation system of claim 2 wherein said second air compressor is a screw-type air compressor.

5. The crankcase ventilation system of claim 2 wherein said second air compressor is a piston-type air compressor.

6. A crankcase ventilation system for a vehicle which routes vented crankcase gases to an intake manifold for combustion, said vehicle including an air cleaner, a first compressor located downstream from said aircleaner and having an inlet to receive air from said aircleaner, an aftercooler located downstream from said first compressor, and an engine located downstream from said aftercooler, said engine having an intake manifold, a crankshaft, a crankcase and a crankcase breather port through which blow-by gases exit said crankcase, said crankcase ventilation system comprising:

a second air compressor having an inlet and an outlet capable of delivering pressurized air to said intake manifold;

a breather line having an inlet to receive crankcase blow-by gases exiting said breather port and having an outlet that delivers said blow-by gases to said inlet of said second air compressor; and a relief valve located along said breather line prior to said second air compressor inlet wherein said relief valve is configured to open when the air pressure in said breather line exceeds a predetermined value.

7. The crankcase ventilation system of claim 6 wherein said relief valve further includes a sensor to detect when said relief valve is open.

8. A crankcase ventilation system for a vehicle which routes vented crankcase gases to an intake manifold for combustion, said vehicle including an air cleaner, a turbocharger compressor located downstream from said aircleaner and having an inlet to receive air from said aircleaner, an aftercooler located downstream from said turbocharger compressor and having an inlet to receive air from said turbocharger compressor, an engine located downstream from said aftercooler, said engine having an intake manifold, a crankshaft, a crankcase and a crankcase breather port through which blow-by gases exit said crankcase, and an aftercooler outlet conduit connecting said aftercooler to said intake manifold, said crankcase ventilation system comprising:

an air compressor having an inlet and an outlet capable of delivering pressurized air to said aftercooler outlet conduit at a point between said aftercooler and said intake manifold;

a breather line having an inlet to receive crankcase blow-by gases exiting said breather port and having an outlet that delivers said blow-by gases to said inlet of said air compressor; and a bleed air line having an inlet to receive air from said aircleaner, an outlet to deliver air to said inlet of said air compressor, and a one-way flow valve located between said bleed air inlet and said bleed air outlet, wherein said flow valve prevents airflow from said bleed air outlet to said bleed air inlet.

9. The crankcase ventilation system of claim 8 further comprising an oil separator located along said breather line between said breather port and said air compressor inlet.

10. The crankcase ventilation system of claim 8 wherein said air compressor is a positive-displacement type air compressor.

11. The crankcase ventilation system of claim 10 wherein said air compressor is powered by said crankshaft.

12. The crankcase ventilation system of claim 10 wherein said air compressor is a screw-type air compressor.

13. The crankcase ventilation system of claim 10 wherein said air compressor is a piston-type air compressor.

14. The crankcase ventilation system of claim 8 further comprising a relief valve located along said breather line prior to said air compressor inlet wherein said relief valve is configured to open when the air pressure in said breather line exceeds a predetermined value.

15. The crankcase ventilation system of claim 14 wherein said relief valve further includes a sensor to detect when said relief valve is open.

16. The crankcase ventilation system of claim 8 further comprising a shut off valve located along said aftercooler outlet conduit between said air compressor outlet and said intake manifold.

17. A crankcase ventilation system for a vehicle which routes vented crankcase gases to an intake manifold for combustion, said vehicle including an air cleaner, a first compressor located downstream from said aircleaner and having an inlet to receive air from said aircleaner, an aftercooler located downstream from said first compressor, and an engine located downstream from said aftercooler, said engine having an intake manifold, a crankshaft, a crankcase and a crankcase breather port through which blow-by gases exit said crankcase, said crankcase ventilation system comprising:

a second air compressor having an inlet and an outlet capable of delivering pressurized air to said intake manifold;

a breather line having an inlet to receive crankcase blow-by gases exiting said breather port and having an outlet that delivers said blow-by gases to said inlet of said second air compressor; and a bleed air line having an inlet to receive air from said aircleaner, an outlet that delivers said air to said inlet of said second air compressor, and a one-way flow valve located between said bleed air inlet and said bleed air outlet, wherein said valve prevents airflow from said bleed air outlet to said bleed air inlet.

18. The crankcase ventilation system of claim 17 further comprising an oil separator located along said breather line prior to said second air compressor inlet.

19. The crankcase ventilation system of claim 17 wherein said second air compressor is a positive-displacement type compressor.

20. The crankcase ventilation system of claim 19 wherein said second air compressor is powered by said crankshaft.

21. The crankcase ventilation system of claim 19 wherein said second air compressor is a screw-type air compressor.

22. The crankcase ventilation system of claim 19 wherein said second air compressor is a piston-type air compressor.

23. The crankcase ventilation system of claim 17 further comprising a relief valve located along said breather line prior to said second air compressor inlet wherein said relief valve is configured to open when the air pressure in said breather line exceeds a predetermined value.

24. The crankcase ventilation system of claim 23 wherein said relief valve further includes a sensor to detect when said relief valve is open.

* * * * *